United States Patent
Broz et al.

(10) Patent No.: US 10,176,785 B2
(45) Date of Patent: Jan. 8, 2019

(54) SYSTEM AND METHOD OF ADJUSTING A DEVICE DISPLAY BASED ON EYEWEAR PROPERTIES

(71) Applicant: International Business Machines Corporation, Armonk, NY (US)

(72) Inventors: Michal Broz, Austin, TX (US); Steven D. Clay, Round Rock, TX (US); Richard S. Schwerdtfeger, Round Rock, TX (US); Shunguo Yan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 100 days.

(21) Appl. No.: 15/156,496

(22) Filed: May 17, 2016

(65) Prior Publication Data
US 2017/0336864 A1 Nov. 23, 2017

(51) Int. Cl.
*G09G 5/30* (2006.01)
*G06K 9/00* (2006.01)
(Continued)

(52) U.S. Cl.
CPC ............ *G09G 5/30* (2013.01); *G06K 9/00281* (2013.01); *G06T 7/11* (2017.01); *G06T 7/194* (2017.01);
(Continued)

(58) Field of Classification Search
CPC ...... G09G 3/003; G09G 3/342; G09G 3/3413; G09G 5/02; G09G 5/10; G09G 2310/0235; G09G 2310/061; G09G 2320/0261; G09G 2320/0271; G09G 2320/0666; G09G 2320/066; G09G 2340/06; G09G 2360/145; G09G 2360/144; G09G 2360/16; G09G 2354/00; G02F 2001/133626; G02F 1/133621; G02F 1/133603; G06T 5/00; G06T 5/006
See application file for complete search history.

(56) References Cited

U.S. PATENT DOCUMENTS

| 6,271,813 B1 | 8/2001 | Palalau |
|---|---|---|
| 8,102,478 B2 | 1/2012 | Xue |

(Continued)

FOREIGN PATENT DOCUMENTS

| CN | 2510940 | 9/2002 |
|---|---|---|
| JP | 2007072627 A1 * | 3/2007 |

(Continued)

OTHER PUBLICATIONS

English language translation of JP 2007-072627; Published Mar. 2007; Authors: Kasugai Junya et al. (Year: 2007).*
(Continued)

*Primary Examiner* — Nalini Mummalaneni
(74) *Attorney, Agent, or Firm* — Maeve M. Carpenter; Maxine L. Barasch; Keohane & D'Alessandro PLLC

(57) ABSTRACT

The present invention provides a system and method of adjusting an electronic device display based on eyewear properties. Eyewear properties such as tint level, tint shade, and polarization are obtained from eyewear, a database, or manual entry. The device display is then adjusted based on the eyewear properties to facilitate viewability of the electronic display for the user while wearing the eyewear.

19 Claims, 10 Drawing Sheets

(51) Int. Cl.
  *G06T 7/11* (2017.01)
  *G06T 7/194* (2017.01)
  *G09G 5/02* (2006.01)
  *G09G 5/10* (2006.01)
  *G06T 11/00* (2006.01)

(52) U.S. Cl.
  CPC ............... *G06T 11/00* (2013.01); *G09G 5/02* (2013.01); *G09G 5/10* (2013.01); *G09G 2320/066* (2013.01); *G09G 2320/0626* (2013.01); *G09G 2320/0666* (2013.01); *G09G 2354/00* (2013.01); *G09G 2360/144* (2013.01)

(56) References Cited

U.S. PATENT DOCUMENTS

| | | | | |
|---|---|---|---|---|
| 8,411,907 | B2* | 4/2013 | Nelson | G06F 3/005 250/206 |
| 8,818,034 | B2* | 8/2014 | Zhang | G06K 9/00221 340/5.52 |
| 8,884,939 | B2 | 11/2014 | Barnhoefer et al. | |
| 8,922,480 | B1* | 12/2014 | Freed | G09G 5/00 345/156 |
| 2009/0033676 | A1* | 2/2009 | Cybart | G09G 3/2003 345/589 |
| 2011/0305375 | A1* | 12/2011 | Nelson | G06F 3/005 382/118 |
| 2012/0050265 | A1 | 3/2012 | Heng | |
| 2013/0002666 | A1 | 1/2013 | Mihara et al. | |
| 2013/0127821 | A1 | 5/2013 | Lewis et al. | |
| 2013/0293456 | A1* | 11/2013 | Son | G06F 3/013 345/156 |
| 2015/0213573 | A1* | 7/2015 | Mukawa | G02B 27/017 345/522 |
| 2015/0332576 | A1 | 11/2015 | Son | |
| 2016/0110846 | A1* | 4/2016 | Park | G06T 5/00 345/589 |
| 2018/0039864 | A1* | 2/2018 | Yao | G06K 9/38 |

FOREIGN PATENT DOCUMENTS

| | | |
|---|---|---|
| WO | 2012105184 A1 | 8/2012 |
| WO | 2013033170 A2 | 3/2013 |
| WO | 2013120180 A1 | 8/2013 |

OTHER PUBLICATIONS

Caramba App Development, "EasyMeasure—Measure with your Camera!", https://itunes.apple.com/us/app/easymeasure-measure-your-camera!/id349530105?mt=8, Mar. 24, 2012, 3 pages.
Griffiths, Alex, "No glasses required—future iPad screens will auto-adjust focus to help long or shortsighted people", http://www.mirror.co.uk/news/world-news/no-glasses-required---future-3934619, Jul. 30, 2014, 2 pages.
Takahashi, Dean, "Glasses.com's mobile app scans your face in 3D, lets you try on sunglasses virtually", http://venturebeat.com/2013/04/09/glasses-coms-mobile-app-scans-your-face-into-3d-and-try-on-sunglasses-virtually/, Apr. 9, 2013, 4 pages.
Collins, Robert, "CSE/EE486 Computer Vision 1; Introduction to Computer Vision", Lecture 29, Penn State University, 2007, 6 pages.
Mousavi, Seyedmohammad A. et al., "Coherent control of optical polarization effects in metamaterials", Scientific Reports, Mar. 10, 2015, 11 pages.
Westfall, J., "Customizing Your Phone", Windows Phone 7 Made Simple, Chapter 6, 2011, 12 pages.
Sawaki, Akiko et al., "Three Dimensional Image Display Without Special Eyeglasses: Observation of Magnetic Resonance Angiography Using the Stereoscopic Liquid Crystal Display", Journal of Digital Imaging, vol. 14, No. 3, Sep. 2001, 6 pages.
Jing, Zhong et al., "Glasses Detection and Extraction by Deformable Contour", Real World Computing Partnership, Pattern Recognition, 2000. Proceedings. 15th International Conference on (vol. 2 ), 4 pages.
Author Unknown, "Pocket Detective 2.1: Window Tint Meter for Fixed & Roll Down Automobile Glass", https://gardco.com/pages/gloss/pocket_detective.cfm, Jul. 12, 2015, 2 pages.
Author Unknown, "Polarization and Polarization Control", Application Note 3, New Focus, Inc., 1993, 8 pages.
Wu, Chenyu et al., "Automatic Eyeglasses Removal from Face Images", IEEE Transactions on Pattern Analysis and Machine Itelligence, vol. 26, No. 3, Mar. 2004, 14 pages.

* cited by examiner

SYSTEM AND METHOD OF ADJUSTING A DEVICE DISPLAY BASED ON EYEWEAR PROPERTIES

FIELD OF THE INVENTION

The present invention relates generally to electronic displays, and more particularly to a system and method of adjusting a device display based on eyewear properties.

BACKGROUND

Eyewear comes in a variety of shapes and sizes. There are different eyewear for different applications. Tinted eyewear is commonly used for both prescription and off-the-shelf sunglasses. Typically, sunglass lenses are tinted in a bath of tint solution. The more time the lenses spend in the bath, the more tint they absorb. Typical tint levels range from 20 percent up to about 80 percent. Lenses with 20 percent tint level (density) are usually considered for fashion purposes only, while those with 50 percent tint level are suitable for most activities. A tint level of 80 percent provides maximum protection against the sun. Additionally, photochromic eyewear can change its tint level in response to ambient light conditions. Thus, the tint level of photochromic eyewear can change over time. Some eyewear may include polarized lenses. Polarized lenses serve to block glare by restricting certain angles of light. This helps in limiting eye-strain and can be very helpful to people working in and around water. In addition to polarization and tint level, the tint shade or lens color is another eyewear parameter. For example, yellow lenses filter blue light that sometimes can make focusing difficult. Copper is a tint shade that tends to enhance contrast and boost oranges, reds, and browns. There are many different tint shades available for various activities and fashion purposes. Thus, eyewear is an important part of everyday life.

SUMMARY

Embodiments of the present invention provide a system and method of adjusting an electronic device display based on eyewear properties. Eyewear properties such as tint level, tint shade, and polarization are obtained from eyewear, a database, or manual entry. The device display is then adjusted based on the eyewear properties to facilitate viewability of the electronic display for the user while wearing the eyewear.

In a first aspect of the present invention, a device is provided, comprising: a processor; a memory coupled to the processor; an electronic display; and an eyewear detection system configured and disposed to detect eyewear on a user, wherein the memory contains instructions, that when executed by the processor, perform the steps of: detecting an eyewear on the user; obtaining one or more eyewear parameters from the detected eyewear; and adjusting one or more display parameters of the electronic display in response to the one or more obtained eyewear parameters.

In a second aspect of the present invention, a computer-implemented method for adjustment of an electronic display of an electronic device is provided, comprising: detecting the presence of an eyewear on a user; detecting one or more eyewear parameters of the eyewear, wherein the one or more eyewear parameters includes tint level; and adjusting one or more display parameters of the electronic display in response to the one or more eyewear parameters, wherein the one or more display parameters includes brightness.

In a third aspect of the present invention, a computer program product for adjustment of an electronic display of an electronic device is provided, comprising a computer readable storage device having program instructions embodied therewith, the program instructions executable by a processor to cause the electronic device to: detect the presence of an eyewear on a user; detect an eyewear orientation angle; obtain one or more eyewear parameters of the eyewear, wherein the one or more eyewear parameters includes tint level, tint shade, and polarization status; and adjust one or more display parameters of the electronic display in response to the one or more eyewear parameters, wherein the one or more display parameters includes brightness, contrast, and a display polarization angle.

BRIEF DESCRIPTION OF THE DRAWINGS

Features of the disclosed embodiments will be more readily understood from the following detailed description of the various aspects of the invention taken in conjunction with the accompanying drawings.

Figure 1:
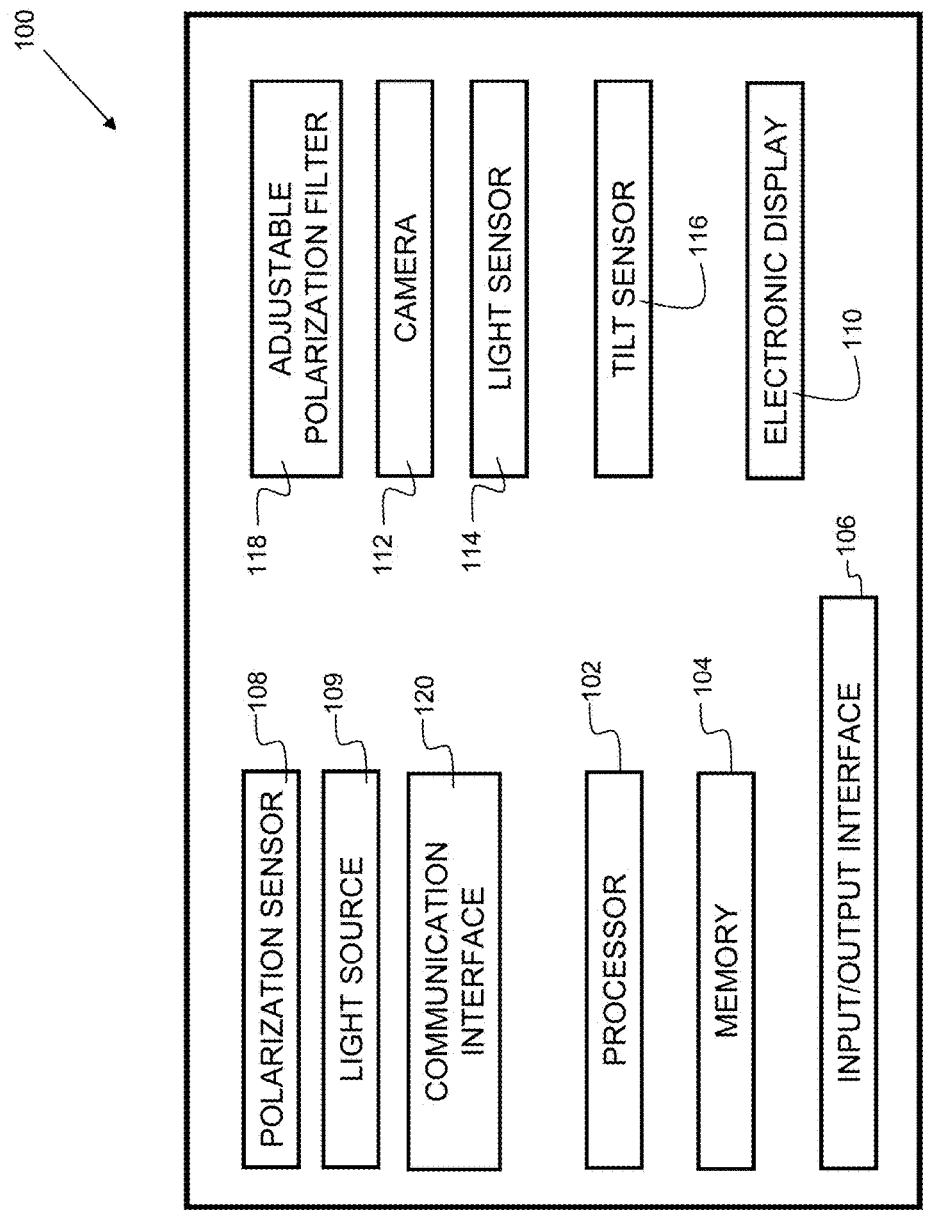
FIG. 1 is a block diagram of a device in accordance with embodiments of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the figures may be omitted, or illustrated not-to-scale, for illustrative clarity.

DETAILED DESCRIPTION

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

FIG. 1 is a block diagram of a device 100 in accordance with embodiments of the present invention. Device 100 includes a processor 102, which is coupled to a memory 104. Memory 104 may include dynamic random access memory (DRAM), static random access memory (SRAM), magnetic storage, and/or a read only memory such as flash, EEPROM, optical storage, or other suitable memory. In some embodiments, the memory 104 may not be a transitory signal per se. Device 100 further includes an input/output (I/O) interface configured to control a variety of on-board peripherals via processor 102. The device 100 further includes an electronic display 110. Electronic display 110 may include a liquid crystal display (LCD), a plasma display, a cathode ray tube (CRT) display, a light emitting diode (LED) display, an organic LED (OLED) display, or other suitable display technology. In some embodiments, electronic display 110 may further serve as a touch screen, incorporating a capacitive or resistive touch screen in some embodiments.

Device 100 may further include a variety of additional peripherals, depending on intended application, price point, and other design factors. For example, device 100 may further include a camera 112. Camera 112 may be a user-facing camera located adjacent to the electronic display. The camera 112 can serve as a peripheral to perform eyewear detection, detection of eyewear properties, and/or detection of ambient light. In some embodiments, device 100 may include a light sensor 114 instead of, or in addition to, camera 112. The light sensor may comprise one or more photoelectric elements suitable for detecting levels of ambient light. Device 100 may further include a polarization sensor 108. The polarization sensor 108 may be implemented as a camera with a linear polarization filter in front of its lens. In some embodiments, this camera may be an additional user-facing camera located adjacent to the electronic display. As a handheld device is rotated, the polarization sensor 108 can detect the polarization of a user's eyewear. The device 100 may further include an adjustable polarization filter 118. The adjustable polarization filter is disposed in front of the electronic display. The processor 102, upon detecting an eyewear polarization from polarization sensor 108, can adjust the polarization filter 118 such that the electronic display 110 is configured to have a polarization angle that allows increased light to reach the user through their polarized eyewear. The polarization angle may be selected to be as close as possible to 90 degrees with respect to the eyewear polarization to facilitate optimal viewing conditions. The device 100 may further include a tilt sensor 116. The tilt sensor 116 may be implemented via one or more accelerometers or other gravity-affected sensors. The tilt sensor 116 provides orientation information to the processor 102, which may be used in the configuration of electronic display 110. The device may further include a light source 109. The light source may be a light emitting diode (LED) that emits visible and/or infrared light to cause a reflection on the user's eyewear. The reflection can be used in detecting the presence of eyewear and/or eyewear parameters. In embodiments, peripherals such as the polarization sensor 108, tilt sensor 116, light sensor 114, light source 109, camera 112, and adjustable polarization filter 118 may be coupled to the processor 102 via input/output interface 106.

The device 100 may further include a communication interface 120. The communication interface 120 may be a wireless communication interface that includes modulators, demodulators, and antennas for a variety of wireless protocols including, but not limited to, Bluetooth™, Wi-Fi, and/or cellular communication protocols. The communication interface 120 may be configured to receive eyewear properties from eyewear that is equipped with a similar communication interface.

In embodiments, the device 100 may have the form factor of a tablet computer, smart phone, or other mobile device. In other embodiments, the device may have the form factor of a laptop computer, desktop monitor, television, or other similar device. Thus, some embodiments may be large displays that generally remain in one position, while other displays may be portable. Some devices in accordance with embodiments of the present invention may have all of the peripherals shown in FIG. 1, whereas other devices in accordance with embodiments of the present invention may only have a subset of the peripherals shown in FIG. 1.

Figure 2:
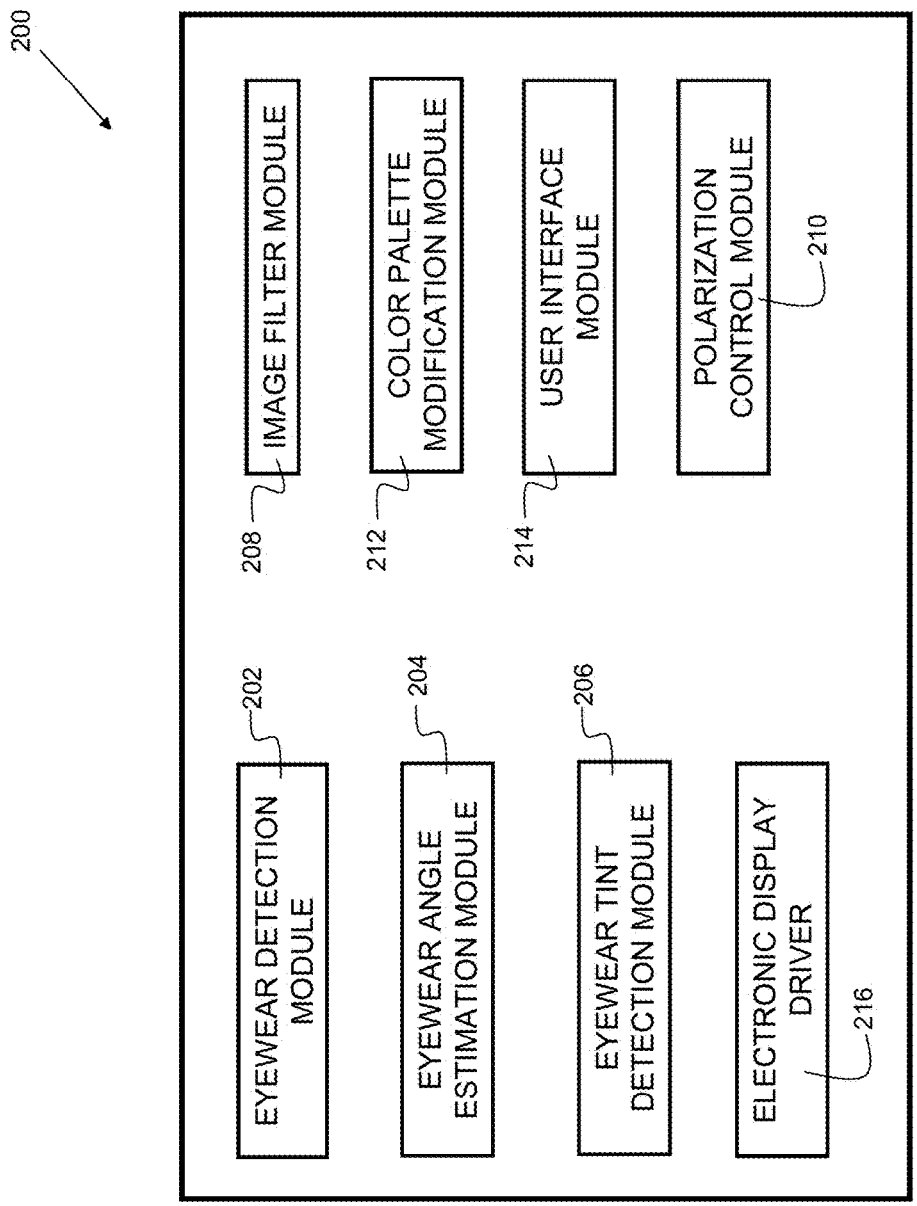
FIG. 2 is a block diagram of modules in accordance with embodiments of the present invention.

FIG. 2 is a block diagram 200 of modules in accordance with embodiments of the present invention. The modules may be implemented as sets of instructions stored within memory 104 (FIG. 1). The modules may include an eyewear detection module 202. The eyewear detection module may perform face detection by identifying a plurality of facial features such as nose and mouth using image processing techniques. The eyewear detection module may then perform a variety of image processing techniques such as edge detection, shape detection, clustering, and/or probabilistic classifiers to determine if the user is currently wearing eyewear. For edge detection, some embodiments may utilize a Canny edge detector algorithm. Some embodiments may utilize mathematical models such as a deformable contour model, and/or an active shape model for eyewear detection. Other suitable detection algorithms or models may be used. The modules may include an eyewear angle estimation module 204. The eyewear angle estimation module may be used to perform a measurement of the relative angle of the eyewear to the device. This information may be used to compensate for polarization. The modules may include an eyewear tint detection module 206. This may include detection of both tint level and tint shade.

The modules may include an image filter module 208. The image filter module 208 may include functions for performing contrast adjustments, brightness adjustments, gamma correction, color shifts, color inversions, equalization, and other transformations to facilitate an adjustment of the electronic display. The color shift may include boosting a certain color component as part of an RGB (red green blue)

value. For example, to boost the green component, each green value of an RGB pixel may be increased by a certain percentage. The image filter module may perform operations in an alternate domain such as YUV, for example, for performing luminance adjustments. In some embodiments, a histogram equalization process may be performed on the luminance.

The modules may include a color palette modification module 212. The color palette modification module 212 may perform a palette-based substitution of colors in response to detected eyewear parameters. This may be used to change the color of one or more objects rendered on the electronic display in response to detected eyewear parameters.

The modules may include a user interface module 214. The user interface module 214 may include a screen for a user to manually enter eyewear parameters. Alternatively, the user interface module 214 may include a screen that allows a user to set up automatic retrieval of eyewear parameters based on eyewear model, a user profile, a medical records profile, or other suitable identifier.

The modules may include a polarization control module 210. The polarization control module 210 may be used to facilitate an adjustment of a polarization filter disposed in front of the electronic device display. In embodiments, the polarization filter is an electronically-adjustable polarization filter. In other embodiments, the polarization filter may be a mechanically-adjustable polarization filter. The mechanically-adjustable polarization filter may be adjustable by the processor via control of motors that move the mechanically-adjustable polarization filter.

The modules include an electronic display driver 216 that interfaces with the hardware of the electronic display to control the output of the electronic display, including parameters such as refresh rate, interlace mode, brightness, contrast, and other display parameters. The modules shown in FIG. 2, along with the peripherals shown in FIG. 1 may comprise an eyewear detection system that is used to detect the presence of eyewear, as well as eyewear parameters pertaining to the detected eyewear.

Figure 3:
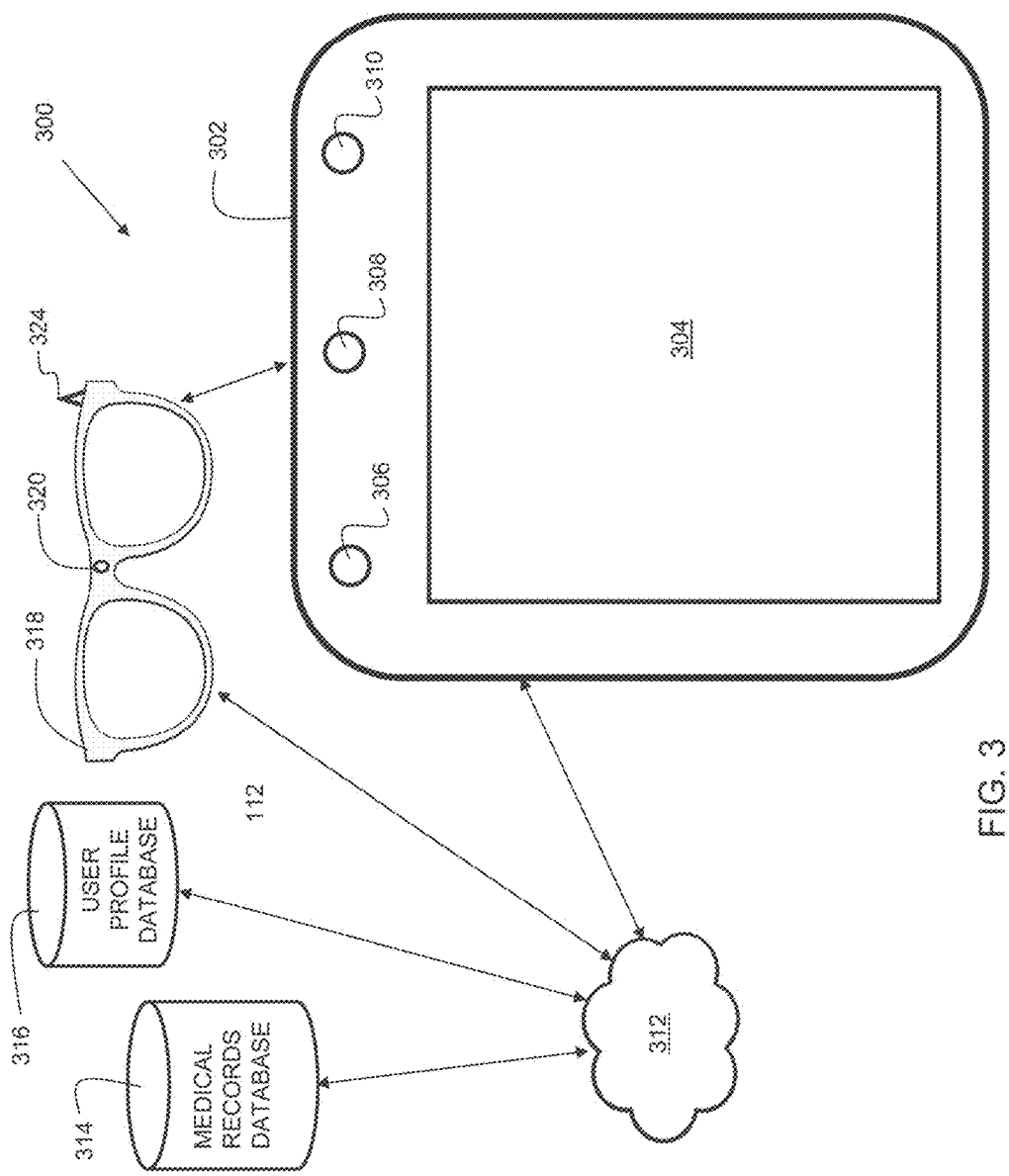
FIG. 3 is an operation block diagram in accordance with embodiments of the present invention.

FIG. 3 is a block diagram 300 of operation in accordance with embodiments of the present invention. Diagram 300 includes device 302. Device 302 may have some or all of the components similar to device 100 shown in FIG. 1. Device 302 includes electronic display 304, user-facing camera 306, light sensor 308, and polarization sensor 310. The device 302 may communicate with network 312 to access a medical records database 314 and/or a user profile database 316. The medical records database 314 and/or user profile database 316 may include information about the user's eyewear such as tint level, tint shade, and polarization information, etc., to name a few. Thus, a user may enter information into device 302 that enables the eyewear parameters of the user's eyewear 318 to be obtained by the device 302. Additionally, the eyewear itself may be capable of communicating with network 312 via its communication interface 324. The eyewear may include an active processor and/or an RDID tag or other suitable mechanism for communication. Furthermore, the eyewear may have its own forward-facing camera 320. The camera 320 may be used to detect certain conditions such as ambient light, and transmit that information to the display 302 via network 312. In embodiments, network 312 may include the Internet. In some embodiments, the eyewear 318 may communicate eyewear parameters to the display 304 directly via Bluetooth™, ad-hoc Wi-Fi connection, near-field communication (NFC) protocols, or other point-to-point connection. In this way, accurate eyewear parameters can be quickly communicated to the device 302.

In embodiments, the device 302 may detect the presence of a user that is wearing eyewear by using its user-facing camera 306. The device 302 may then broadcast an eyewear parameter request message. The eyewear 318, upon receiving the request, may broadcast an eyewear parameters message that is received by the display 302. The display 302 then adjusts display parameters of electronic display 304 based on the received eyewear parameters.

In such embodiments, the device 302 need not belong to the user wearing the eyewear 318. For example, the device 302 could be part of a kiosk in a public area. When the kiosk detects a user wearing eyewear is starting to use the kiosk, the kiosk can initiate the request for eyewear parameters. The eyewear 318 provides the eyewear parameters such as tint level, tint shade, and/or polarization to the device 302, which then compensates for the user's eyewear. When a subsequent user uses the kiosk, if no eyewear is detected on that user, the device 302 may revert to a default display configuration for display 304.

The light sensor 308 may be used to detect ambient light. The amount of ambient light detected can be used as part of the adjustment of display 304. For example, in low ambient light levels, the brightness of the display 304 may be reduced compared to during a condition of high ambient light.

The polarization sensor 310 may be used to detect the polarization of the detected eyewear. The polarization sensor may measure the detected tint level of a user's eyewear at two different angles and, based on the difference, make an estimation of polarization. For non-polarized eyewear, both readings may produce a similar tint level. For polarized eyewear, a reading in one orientation of the device indicates more tint than a reading in another orientation, thus allowing a polarization orientation to be inferred. In embodiments using a handheld device, the user may be prompted to rotate the device as part of a process to assess the polarization of the user's eyewear.

Figure 4:
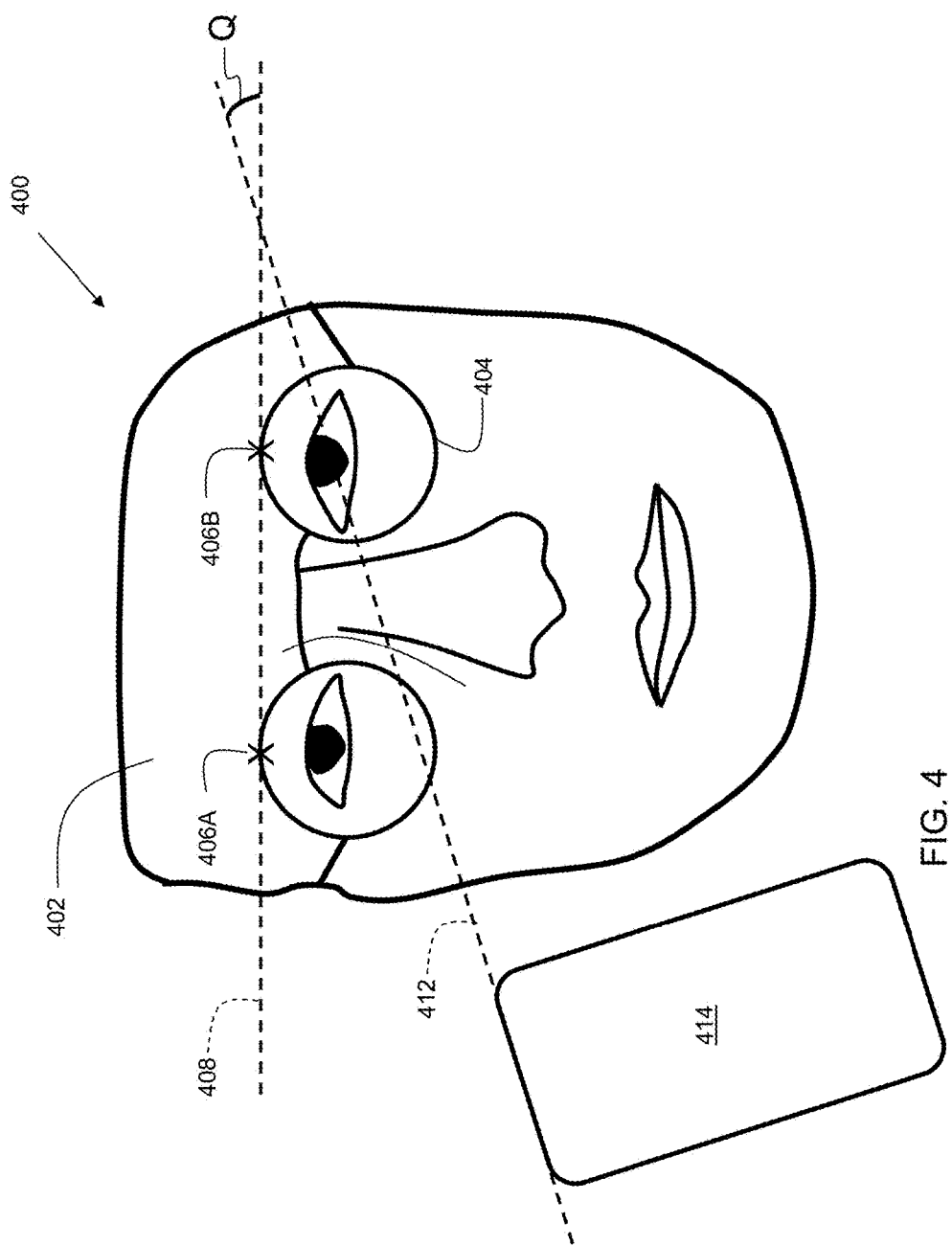
FIG. 4 is a diagram illustrating a detected eyewear orientation angle in accordance with embodiments of the present invention.

FIG. 4 is a diagram 400 illustrating a detected eyewear orientation angle in accordance with embodiments of the present invention. A face 402 of a user is wearing eyewear 404. An image processing algorithm implemented by the eyewear detection module may identify the eyewear using a variety of techniques, such as edge detection and shape identification. The eyewear angle estimation module may identify the peaks of the eyewear over each eye (indicated as reference 406A and 406B), and then compute an imaginary line 408 that traverses through both peaks. The device 414 then computes an imaginary line 412 parallel to the top surface of the device 414. The eyewear orientation angle Q is then computed as the acute angle between line 408 and line 412. In other embodiments, the eyewear orientation angle Q may be computed as the obtuse angle between line 408 and line 412. In some embodiments, the eyewear orientation angle Q is continuously or periodically monitored during usage of the device. In this way, as the user moves his head, or moves the device, the display parameters of the device can be updated based on the change in the eyewear orientation angle Q. In particular, for polarization compensation, the monitoring of the eyewear orientation angle Q can improve a user's experience by allowing real-time adjustments of a polarization angle of the electronic display of the device based on a detected change in the eyewear orientation angle Q.

Figure 5:
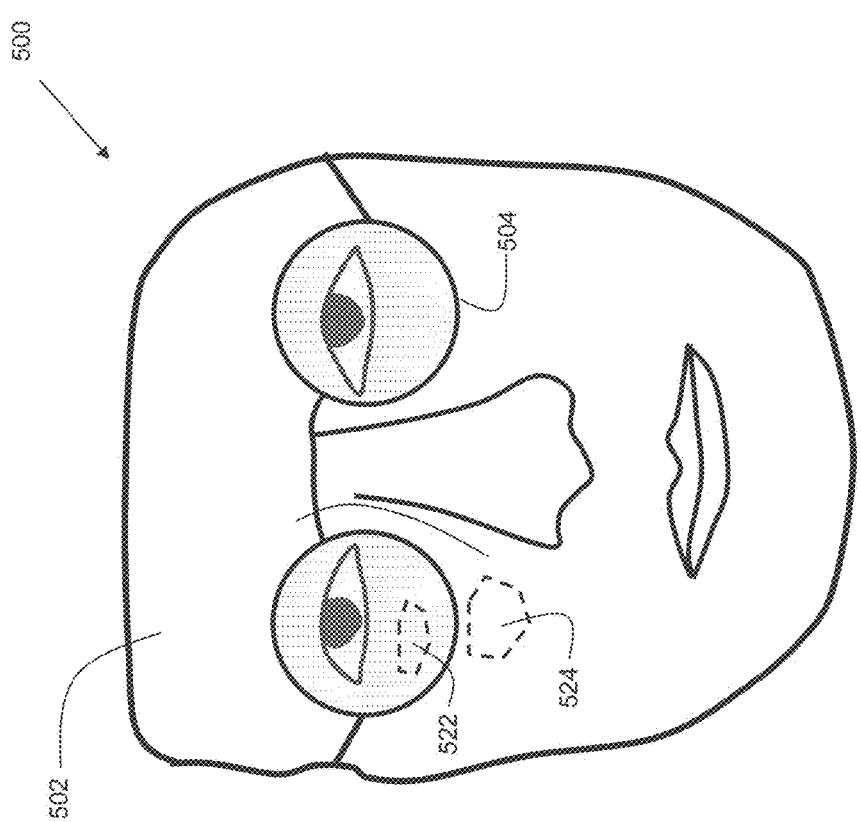
FIG. 5 is a diagram illustrating tint level detection in accordance with embodiments of the present invention.

FIG. 5 is a diagram 500 illustrating tint level detection in accordance with embodiments of the present invention. A face 502 of a user is wearing eyewear 504. In this embodiment, a user-facing camera may analyze skin color or tone in a first region, for example at 522, which is covered by the eyewear 504. The user-facing camera (such as user-facing camera 306 of FIG. 3) may also analyze skin color in a second region 524 which is uncovered, and not behind the eyewear, for example at 504. The device may then perform a comparison between the detected color of region 522 and the detected color of region 524. A greater difference between the detected color of region 522 and the detected color of region 524 indicates a greater level of tint. In this way, even for eyewear that has no communication capabilities, the device can make an assessment of eyewear tint and adjust its electronic display accordingly. For example, the brightness may be adjusted as a function of detected tint, where an increased tint level (darker eyewear) results in increased brightness from the display.

Figure 6:
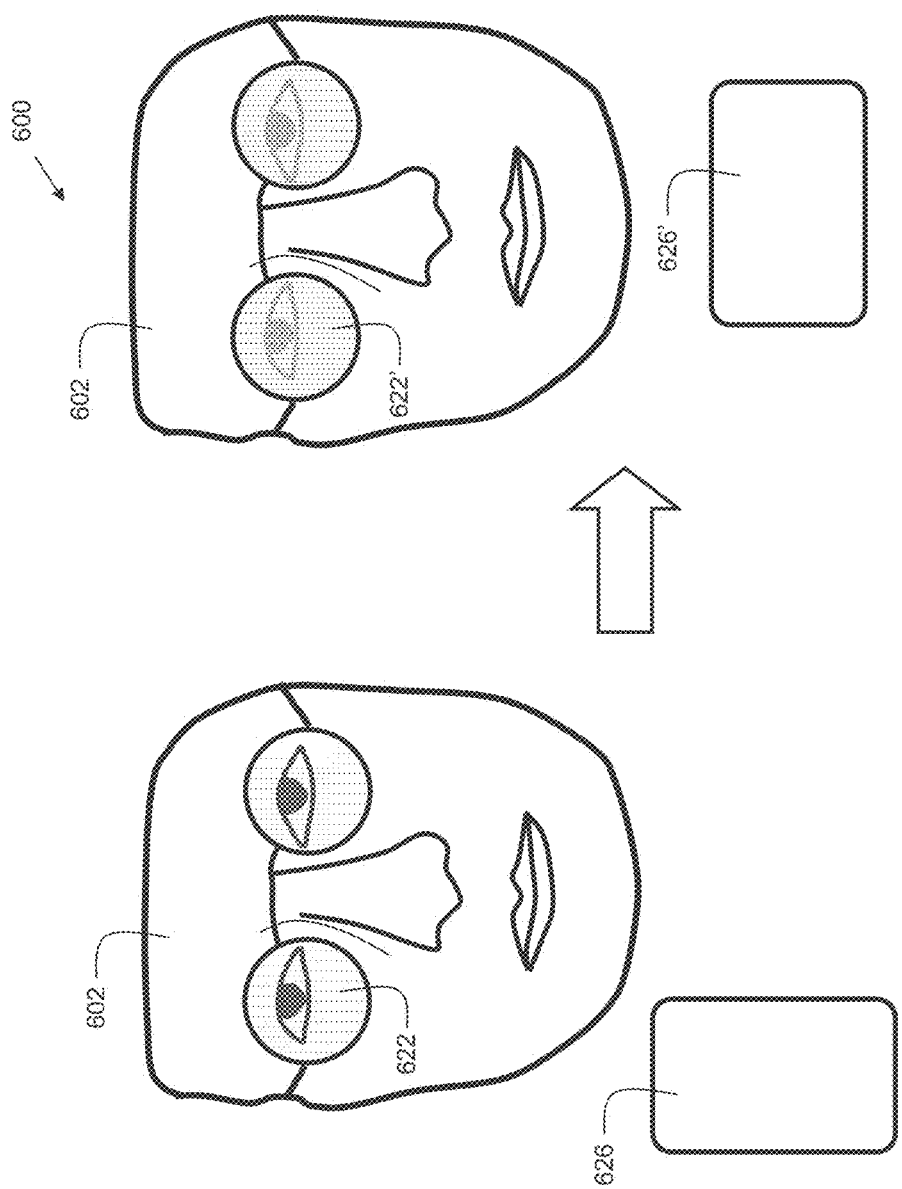
FIG. 6 illustrates polarization angle detection in accordance with embodiments of the present invention.

FIG. 6 is a diagram 600 illustrating polarization angle detection in accordance with embodiments of the present invention. Face 602 is wearing eyewear 622, and the device 626 is oriented in a portrait mode. Device 626 is equipped with a polarization sensor, similar to polarization sensor 310 of FIG. 3. The polarization sensor may be implemented as a user-facing camera with a polarization filter in front of its lens. The user then rotates the device to a landscape mode as indicated by device 626'. The eyewear 622' appears darker to the polarization sensor in the landscape orientation, and thus the device can detect that the eyewear is polarized, and also make an assessment of polarization angle. With this information, the device can then adjust the polarization filters on the electronic display of the device to allow maximum light to pass through the eyewear and thus be visible to the user.

Figure 7:
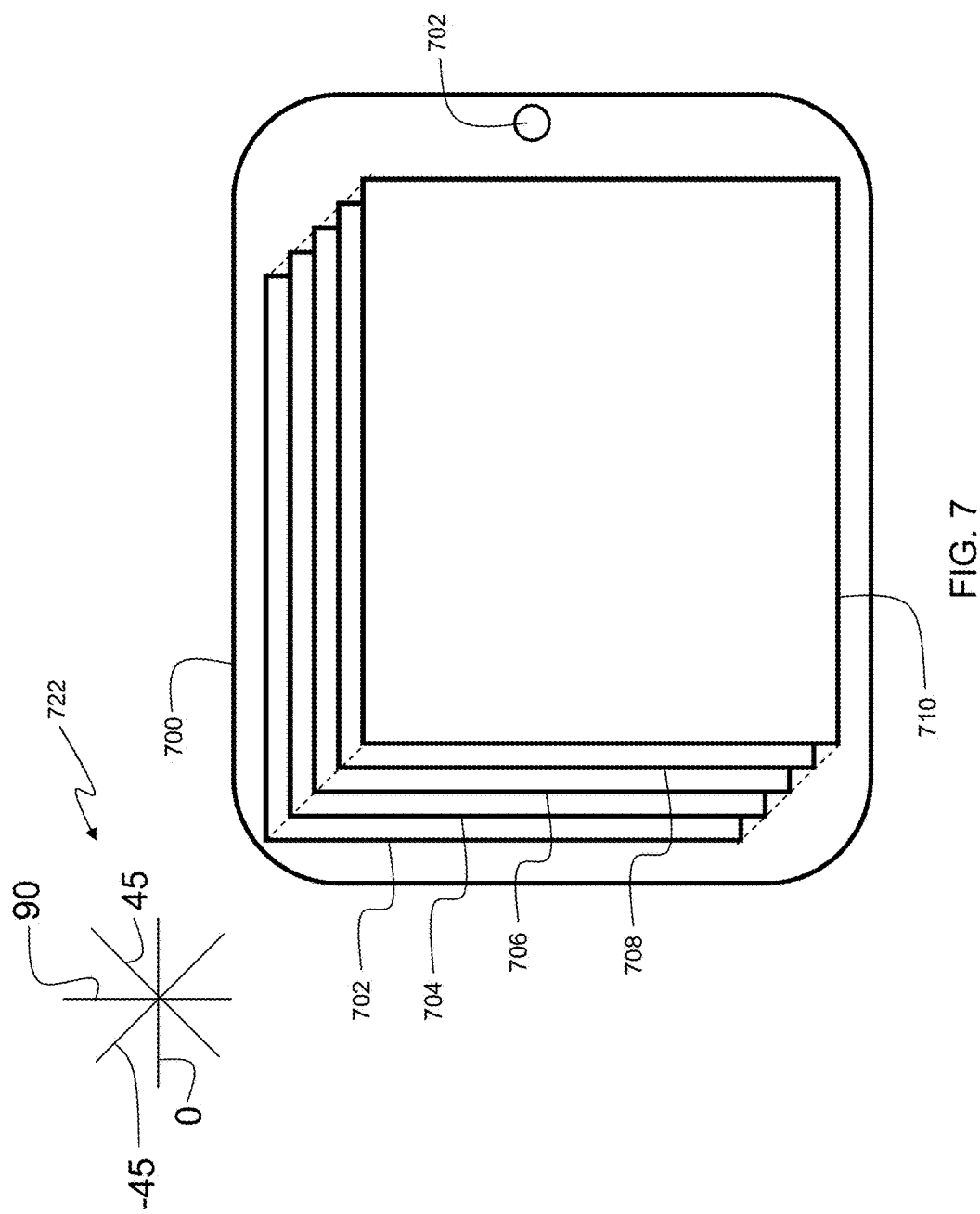
FIG. 7 illustrates a device with an adjustable-angle polarization display in accordance with embodiments of the present invention.

FIG. 7 illustrates an exploded view of a device 700 with an adjustable-angle polarization display in accordance with embodiments of the present invention. In this embodiment, a plurality of electronically-activated polarization filters is disposed in front of a display 702. As shown, there are four electronically-activated polarization filters, indicated as references 704, 706, 708, and 710. In embodiments, the device processor, via the input/output interface, can selectively enable any of the four electronically-activated polarization filters independently. In practice there can be more or fewer electronically-activated polarization filters. When one of the electronically-activated polarization filters is activated, it restricts the emitted light to a particular linear polarization angle. Referring now to angle legend 722, in embodiments, electronically-activated polarization filter 704 has a polarization angle of 0 degrees, electronically-activated polarization filter 706 has a polarization angle of 90 degrees, electronically-activated polarization filter 706 has a polarization angle of 45 degrees, and electronically-activated polarization filter 710 has a polarization angle of −45 degrees. The device 700 continuously detects the eyewear orientation angle Q (see FIG. 4), and activates the electronically-activated polarization filter that is closest to 90 degrees from the eyewear orientation angle Q to facilitate maximum light transmitted through the user's polarized eyewear. In some embodiments, a mechanical polarization filter may be used. In such embodiments, the device may include a motor (not shown) mechanically coupled to the mechanical polarization filter. The motor may be controlled by the processor of the device such that it can adjust the angle of the mechanical polarization filter based on the detected eyewear orientation angle Q.

In an alternative embodiment, the electronically-activated polarization filters each include a liquid crystal that rotates polarized light by a predetermined amount when activated, and does not rotate polarized light when not activated. In such an embodiment, the display 702 may have a passive polarization filter on it, resulting in polarized light passing through the four electronically-activated polarization filters. Each filter may rotate the incoming polarized light when activated, thus changing the display polarization angle.

Figure 8:
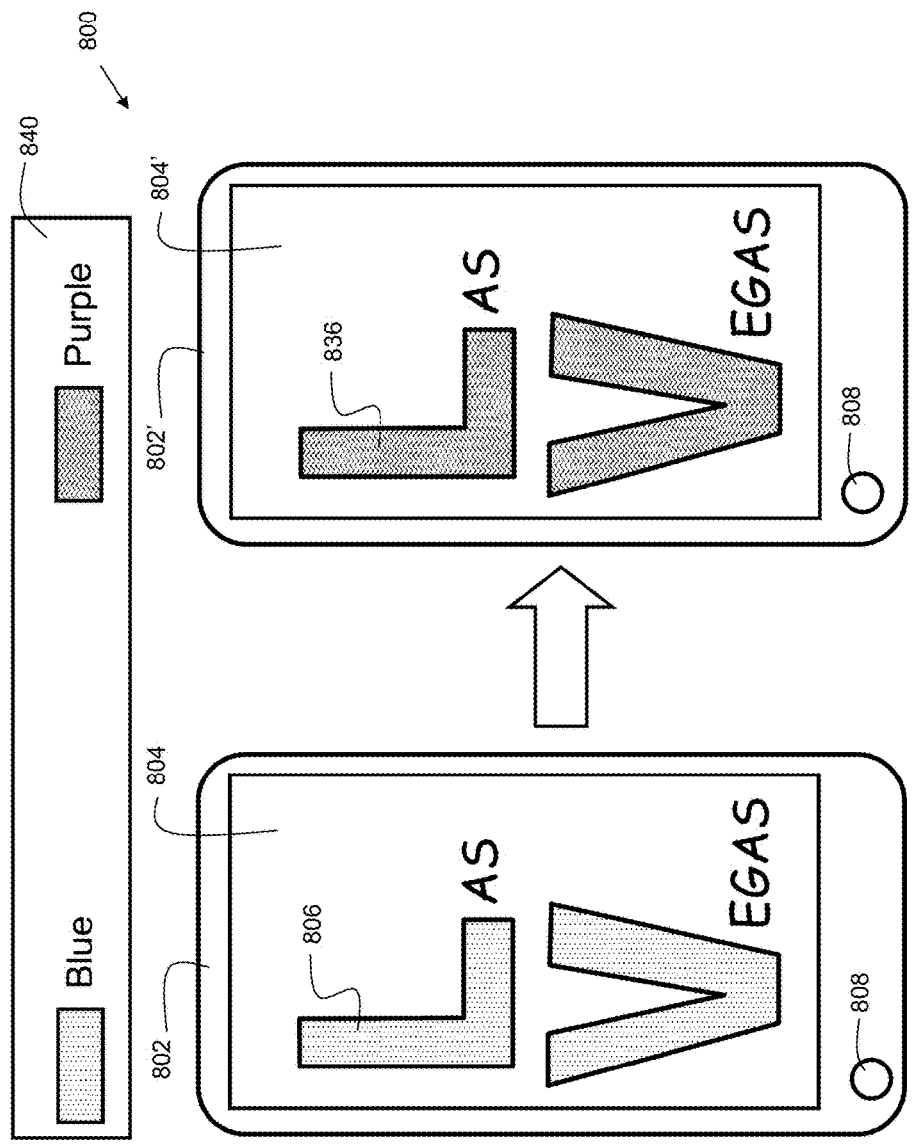
FIG. 8 shows an example of graphics palette color substitution in accordance with embodiments of the present invention.

FIG. 8 shows an example 800 of graphics palette color substitution operation in accordance with embodiments of the present invention. In such an embodiment, a device 802 has an electronic display 804. A user-facing camera 808 may be configured to detect eyewear parameters, including tint shade. Tint shade refers to the color shade of the eyewear. Different color shades have different applications. For example, yellow-tinted eyewear tends to filter out blue light. Thus, upon detecting yellow-tinted eyewear, a device can identify graphic elements with a color falling within a particular range of blue, and substitute that color with a different color. In the example shown in FIG. 8, legend 840 indicates a pattern representing the color blue and another pattern representing the color purple. Device 802 has electronic display 804 which is rendering the word "Las Vegas," where the "L" 806 and the "V" are rendered in blue. Upon the user-facing camera 808 detecting that a user is wearing yellow-tinted eyewear, the display changes as indicated by device 802', in which display 804' renders the "L" 836 and the "V" in purple, making it more visible to a user wearing yellow-tinted eyewear. This example is meant for illustrative purposes only. Many other color substitutions are possible based on detected eyewear shade or other eyewear properties. Color substitution operations may be based on color filtering, color boosting, or other techniques as an alternative, or in addition to, the graphics palette color substitution.

Figure 9:
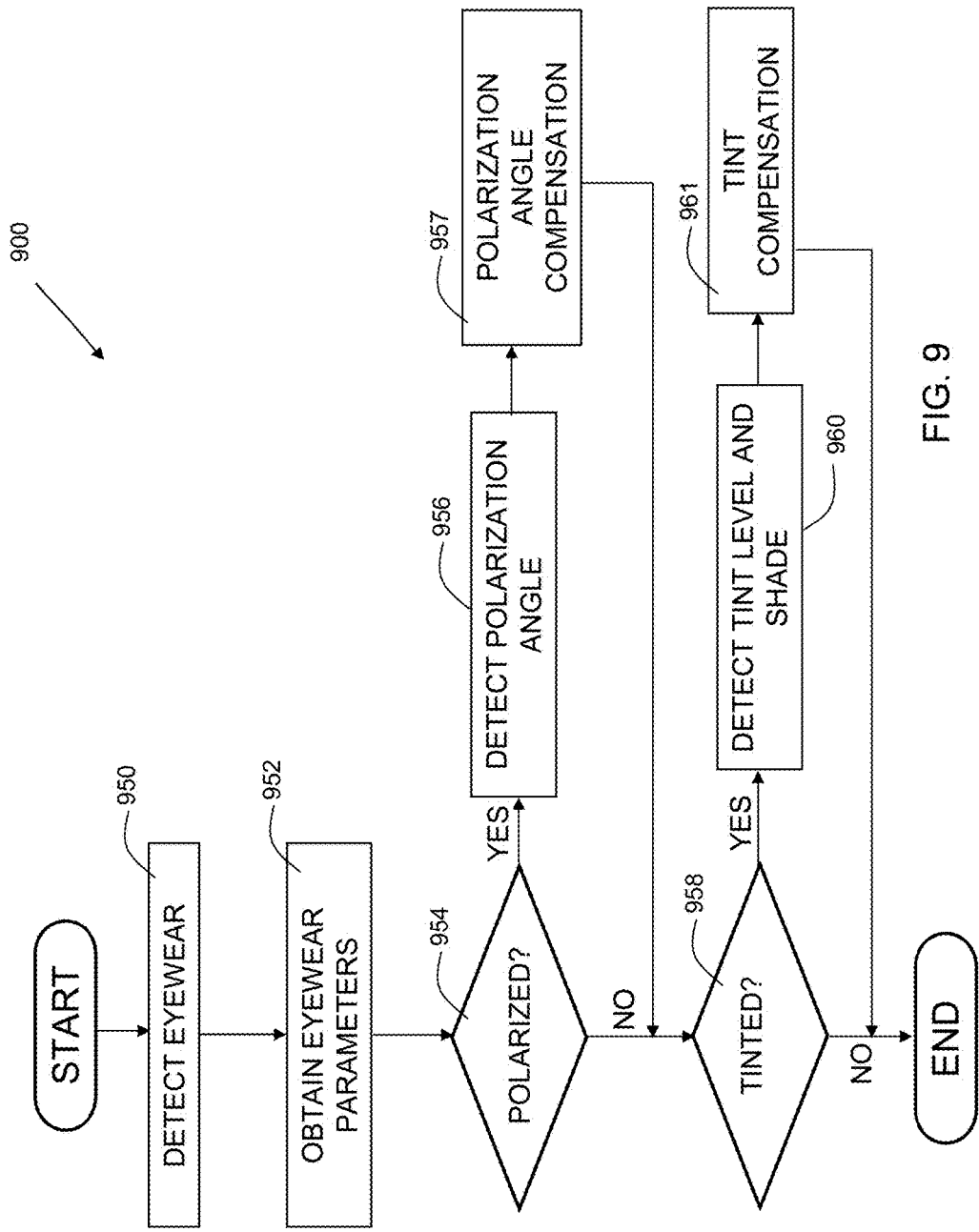
FIG. 9 is a flowchart illustrating a method in accordance with embodiments of the present invention.

FIG. 9 is a flowchart 900 illustrating a method in accordance with embodiments of the present invention. In process step 950, eyewear on a user is detected. The eyewear detection may be performed via a user-facing camera, communication from the eyewear, or a combination of both. Additionally, a light source such as a camera flash or LED light may be used to cause a reflection that the camera may detect to determine that eyewear is being worn. In process step 952, eyewear parameters are obtained. The eyewear parameters may be obtained through detection, communication of parameters from the eyewear, and/or retrieval of eyewear parameters from one or more networked database such as a medical records database, product database, or user profile database, etc. In process step 954, a check is made to determine if the eyewear is polarized. This may include a detection process such as that illustrated in FIG. 6, retrieval of the polarization status from a database, and/or communication of polarization parameters from the eyewear, etc. If the eyewear is not polarized, the process continues to process step 958. If the eyewear is polarized, the process continues to process step 956, where the polarization angle is determined. The determination of polarization may be by using the process illustrated in FIG. 6. In some embodiments, the user may be prompted to rotate his/her device to various orientations as part of a polarization status detection process. The process then continues to process step 957, where the device performs a polarization angle compensation. The compensation may include adjusting a polarization angle on a display of a device such as the device 700 shown in FIG. 7. The process continues to checking if the eyewear is tinted, in process step 958. In process step 960, tint level and/or tint shade are determined. The tint level and tint shade may be part of the eyewear parameters obtained in process step 952. In other embodiments, in step 960, the tint level may be determined by the process illustrated in FIG. 5. The process then continues to process step 961 where tint compensation is performed. This may include adjusting brightness, contrast, hue, saturation, white balance, and/or other electronic display parameters. Additionally, or alternatively, a graphics palette color substitution may be performed as part of the tint compensation, as illustrated in FIG. 8. The process steps may not necessarily be performed in this order, and some steps may be omitted in some embodiments.

Figure 10:
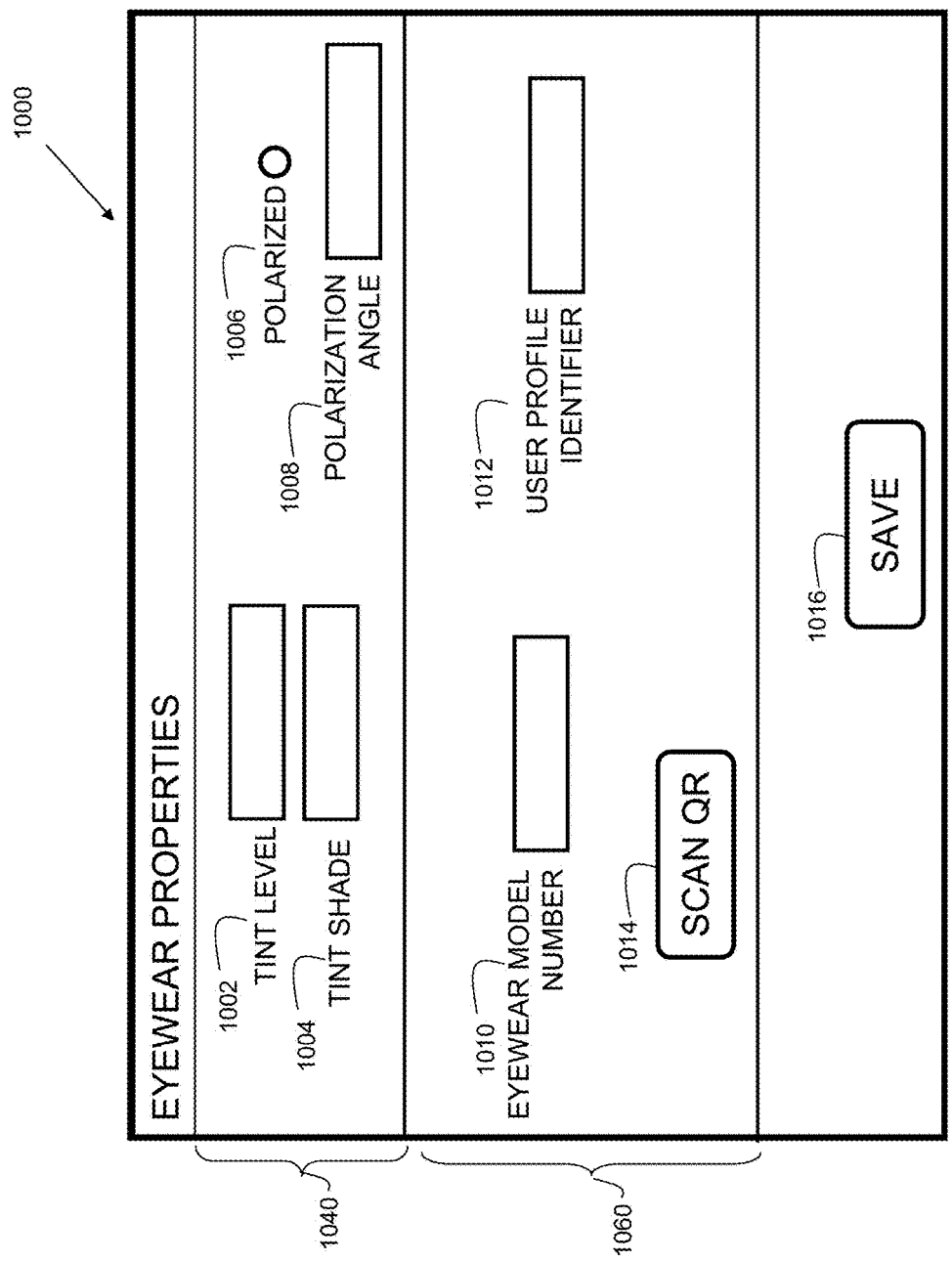
FIG. 10 is an exemplary user interface in accordance with embodiments of the present invention.

FIG. 10 is an exemplary user interface 1000 for embodiments of the present invention. User interface 1000 may be rendered on the electronic display of a device in accordance with embodiments of the invention. The user interface 1000 may include a manual entry section 1040. Manual entry section 1040 allows a user to specify a tint level in field 1002. In embodiments, the tint level may be specified as a number from zero to 100, where zero is completely transparent and 100 is completely opaque. Manual entry section 1040 allows a user to specify a tint shade in field 1004. The tint shade may include specifying a color. Alternatively, the color may be selected via a drop-down list, color wheel, or other graphic element. Manual entry section 1040 allows a user to specify if the eyewear is polarized with radio button 1006. Manual entry section 1040 allows a user to specify a polarization angle in field 1008. Polarization parameters can include, but are not limited to, polarization angle, wavelength efficiency range, and extinction wavelength range. The polarization angle may be an angle of permitted polarized light relative to the orientation of eyewear during use.

The user interface 1000 may include an automatic entry section 1060. Automatic entry section 1060 allows a user to specify an eyewear model number or alphanumeric code in field 1010. For example, a sunglasses manufacturer may provide model number and corresponding eyewear parameters such as tint level, tint shade, and others. Thus, after entering the eyewear model number, the eyewear parameters are retrieved based on the manufacturer information. Alternatively, the user may specify a user profile identifier in field 1012. This may allow a user to retrieve eyewear from a database such as a medical records database. Thus, even prescription eyewear parameters may be retrievable in this manner. Additionally, the automatic entry section 1060 may include a scan QR (quick response) code button 1014. This allows the user to scan a QR code, barcode, or other computer-readable identifier on product packaging or literature to retrieve eyewear parameters. The eyewear parameters may be retrieved from a database such as 314 and/or 316 of FIG. 3. The user can save the eyewear parameters via the save button 1016. The eyewear parameters may then be stored in the memory of the device. In some embodiments, more or fewer features could be included on the user interface 1000.

The eyewear includes, but is not limited to, eyeglasses, sunglasses, reading glasses, augmented reality glasses, safety goggles, skiing goggles, and/or swimming goggles. Additionally the eyewear can be integrated into a helmet such as a motorcycle helmet, aviator helmet, welder helmet, and/or a firefighter helmet. The eyewear may be "connected" eyewear that has communication capabilities such as Bluetooth™ and/or Wi-Fi. The device in accordance with embodiments of the present invention may be a handheld device such as a tablet or smart phone. Additionally the device may be a larger device such as a living room television, a kiosk, an instrument panel of a vehicle, an information screen on a camera, to name a few. In one embodiment, a device is embodied as a television. The television may detect a viewer (user) wearing eyewear. If the television only detects a single viewer, and the viewer is wearing eyewear, the television may adjust the display parameters based on the detected eyewear. If the television detects multiple viewers, the television may revert to default display parameters.

In some embodiments, the device may continuously or periodically monitor eyewear parameters such as tint level and tint shade. Certain eyewear such as photochromic eyewear can change its tint level over time due to ambient light conditions. Embodiments of the present invention can respond to the change in tint level of the eyewear and perform a real-time adjustment of the display based on the detected change in tint level.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

Embodiments of the present invention may also include a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. A device comprising:
    a processor;
    a memory coupled to the processor; and
    an electronic display;
    wherein the memory contains instructions, that when executed by the processor, perform the steps of:
        detecting an eyewear on a user;
        obtaining a tint of the eyewear, the obtaining comprising:
            analyzing a skin color of a first region of the user covered by the eyewear,
            analyzing a skin color of a second region of the user uncovered by the eyewear,
            comparing the color of the first region and the second region, and
            determining the tint of the eyewear based on the difference in the color of the first region and the color of the second region; and
        adjusting one or more display parameters of the electronic display in response to the determined tint of the eyewear,
    wherein the eyewear comprises lenses through which light can pass and be visible to the user.

2. The device of claim 1, wherein the eyewear detection system includes a user-facing camera, and wherein the memory further contains instructions for detecting a tint parameter of the detected eyewear.

3. The device of claim 1, wherein the memory further contains instructions for adjusting the one or more display parameters of the electronic display in response to a detected change in the determined tint.

4. The device of claim 1, wherein the memory further contains instructions for performing a color shift on the electronic display in response to a detected change in tint level.

5. The device of claim 1, wherein the memory further contains instructions for performing a contrast adjustment on the electronic display in response to a detected change in tint level.

6. The device of claim 1, wherein the memory further contains instructions for performing a brightness adjustment on the electronic display in response to a detected change in tint level.

7. The device of claim 2, wherein the memory further contains instructions for detecting a tint shade of the detected eyewear.

8. The device of claim 7, wherein the memory further contains instructions for performing a color shift on the electronic display in response to the detected tint shade.

9. The device of claim 7, wherein the memory further contains instructions for performing a contrast adjustment on the electronic display in response to the detected tint shade.

10. The device of claim 7, wherein the memory further contains instructions for performing a brightness adjustment on the electronic display in response to the detected tint shade.

11. The device of claim 1, further comprising a wireless communication interface, and wherein the memory further contains instructions for obtaining the one or more eyewear parameters from the eyewear via the wireless communication interface.

12. The device of claim 11, wherein the one or more eyewear parameters include tint level, tint shade, and polarization parameter.

13. The device of claim 1, further comprising an adjustable-angle polarization filter disposed on the display, and wherein the memory contains instructions, that when executed by the processor, perform the steps of:
    obtaining a polarization parameter for the eyewear;
    determining an orientation angle of the eyewear relative to the device; and
    adjusting the polarization filter in response to the determined orientation angle of the eyewear.

14. A computer-implemented method for adjustment of an electronic display of an electronic device, comprising:
    detecting an eyewear on a user;
    obtaining a tint of the eyewear, the obtaining comprising:
        analyzing a skin color of a first region of the user covered by the eyewear,
        analyzing a skin color of a second region of the user uncovered by the eyewear,
        comparing the color of the first region and the second region, and
        determining the tint of the eyewear based on the difference in the color of the first region and the color of the second region; and
    adjusting one or more display parameters of the electronic display in response to the determined tint of the eyewear, wherein the eyewear comprises lenses through which light can pass and be visible to the user.

15. The method of claim 14, wherein detecting one or more eyewear parameters of the eyewear includes detecting a polarization status and an eyewear orientation angle, and wherein adjusting one or more display parameters of the electronic display includes adjusting a display polarization angle.

16. The method of claim 14, wherein detecting one or more eyewear parameters of the eyewear includes detecting a tint shade of the eyewear, and wherein adjusting one or more display parameters of the electronic display includes performing a color substitution operation.

17. The method of claim 16, wherein detecting one or more eyewear parameters of the eyewear includes detecting a tint shade of the eyewear, and wherein performing a color substitution operation includes performing a graphics palette color substitution.

18. A computer program product for adjustment of an electronic display of an electronic device, comprising a computer readable hardware storage device having program instructions embodied therewith, the program instructions executable by a processor to cause the electronic device to:

detect an eyewear on a user;
obtain a tint of the eyewear, the obtaining comprising:
- analyze a skin color of a first region of the user covered by the eyewear,
- analyze a skin color of a second region of the user uncovered by the eyewear,
- compare the color of the first region and the second region, and
- determine the tint of the eyewear based on the difference in the color of the first region and the color of the second region; and adjust one or more display parameters of the electronic display in response to the determined tint of the eyewear, wherein the eyewear comprises lenses through which light can pass and be visible to the user.

19. The computer program product of claim 18, further comprising instructions for performing a color substitution operation.

* * * * *